(12) United States Patent
Jurca

(10) Patent No.: US 8,878,096 B2
(45) Date of Patent: Nov. 4, 2014

(54) METHOD AND DEVICE FOR DETECTING AND ADJUSTING THE FOCUS OF A LASER BEAM WHEN LASER MACHINING WORKPIECES

(75) Inventor: Marius Jurca, Stattmatten (FR)

(73) Assignee: LT Ultra-Precision-Technology GmbH, Herdwangen-Schoenach (DE)

( * ) Notice: Subject to any disclaimer, the term of this patent is extended or adjusted under 35 U.S.C. 154(b) by 327 days.

(21) Appl. No.: 13/514,125

(22) PCT Filed: Dec. 16, 2010

(86) PCT No.: PCT/EP2010/069966
§ 371 (c)(1),
(2), (4) Date: Sep. 11, 2012

(87) PCT Pub. No.: WO2011/085904
PCT Pub. Date: Jul. 21, 2011

(65) Prior Publication Data
US 2013/0001208 A1 Jan. 3, 2013

(30) Foreign Application Priority Data

Dec. 21, 2009 (DE) .................. 10 2009 059 245

(51) Int. Cl.
*B23K 26/04* (2014.01)
*B23K 26/046* (2014.01)
(52) U.S. Cl.
CPC ............ *B23K 26/046* (2013.01); *B23K 26/04* (2013.01)
USPC ................................ 219/121.81; 219/121.83
(58) Field of Classification Search
CPC ................................. B23K 26/02; B23K 26/04
USPC ................ 219/121.6–121.72, 121.78–121.83
See application file for complete search history.

(56) References Cited

U.S. PATENT DOCUMENTS

| | | | | |
|---|---|---|---|---|
| 5,670,773 A * | 9/1997 | Planeix | ...................... | 250/201.2 |
| 5,698,120 A * | 12/1997 | Kurosawa et al. | ....... | 219/121.62 |
| 5,850,068 A | 12/1998 | Peters | | |
| 6,555,780 B1 * | 4/2003 | Kim et al. | ................ | 219/121.64 |
| 8,456,523 B2 * | 6/2013 | Stork genannt Wersborg | | 348/90 |
| 8,525,073 B2 * | 9/2013 | Quitter et al. | ............ | 219/121.67 |
| 2007/0119835 A1* | 5/2007 | Nomaru | .................. | 219/121.73 |
| 2012/0138586 A1* | 6/2012 | Webster et al. | .......... | 219/121.64 |

FOREIGN PATENT DOCUMENTS

| | | |
|---|---|---|
| DE | 4106008 | 8/1992 |
| DE | 10056329 | 7/2002 |
| DE | 69721378 | 10/2003 |
| DE | 10248458 | 5/2004 |
| EP | 0490146 | 11/1991 |
| EP | 1908544 | 9/2008 |
| JP | 61137693 | 7/1990 |
| JP | 01122688 | 7/2001 |

OTHER PUBLICATIONS

International Search Report Dated Apr. 18, 2011 PCT/EP2010/069966.
Written Opinion for PCT/EP2010/069966.
English abstract for JP 1122688, May 15, 1989.
English translation of International Preliminary Report for PCT/EP2010/069966 dated Jul. 10, 2012.

\* cited by examiner

*Primary Examiner* — Samuel M Heinrich
(74) *Attorney, Agent, or Firm* — Fleit Gibbons Gutman Bongini & Bianco PL; Martin Fleit; Paul D. Bianco

(57) ABSTRACT

The invention relates to a method for detecting and adjusting the focus (F) of a laser beam when laser machining workpieces, having the following steps: a.) guiding and focusing a laser beam of a machining laser (1) emitted from a machining head (48) into a machining point (26) on or with respect to the surface (49) of a workpiece to be machined, wherein the focusing takes place by means of an optical focusing element (2); b.) guiding and focusing the radiation (28, 31) emitted by at least one first adjusting light source (22) and one second adjusting light source (23) onto the surface (49) of the workpiece to be machined, wherein the wavelengths of the radiation emitted by the adjusting light sources (22, 23) are different; c.) uncoupling the electromagnetic radiation arising about the machining point (26) due to scattering and/or reflecting the laser beam (1) of the machining laser at the surface (49) of the workpiece to be machined, by means of an optical system (2, 4) having chromatic aberration, and detecting the intensity thereof by means of a first detector (5); d.) uncoupling the radiation (34, 36) of the adjusting light sources (22, 23) reflected back from the surface of the workpiece to be machined by means of the optical system (2, 4) having chromatic aberration and separate detecting of the intensities of the reflected radiation (34, 36) of the adjusting light sources (22, 23) by means of at least one second detector (20); e.) determining the location of the focus (F) of the laser beam (1) of the machining laser using the intensities captured in the steps c.) and d.); and f.) adjusting the focus (F) of the laser beam (1) of the machining laser to a desired machining point (26) with respect to the surface (49) of the workpiece to be machined.

19 Claims, 5 Drawing Sheets

METHOD AND DEVICE FOR DETECTING AND ADJUSTING THE FOCUS OF A LASER BEAM WHEN LASER MACHINING WORKPIECES

FIELD OF THE INVENTION

The invention concerns a method and a device for detecting and adjusting the focus of a laser beam in the laser machining of workpieces.

BACKGROUND OF THE INVENTION

In the machining of workpieces with laser beams, for example in laser cutting, laser welding, laser inscribing or laser engraving, machining heads are used, the machining heads can be moved with respect to the workpiece that is to be machined, and in them, a laser beam emitted from a machining laser is guided by means of an optical system onto the surface of the workpiece and focused there at a machining point. Exact positioning and focusing of the laser beam of the machining laser on the surface of the workpiece is necessary to guarantee as efficient as possible a conduct of the laser beam machining. In this regard, for example, a method and a device for detecting and setting the position of the laser beam on the surface of a workpiece being machined is known from EP 1 908 544 A2. With the known method, first, the actual values of the position of the laser beam are detected via one or more beam position detectors and are then matched with the specified values of the laser position by adjusting the optical system. The adjustment of the optical system in this case takes place, for example, via a mirror arrangement with an adaptive mirror.

In addition, methods for setting the focal position of a laser beam of a machining laser aimed at a workpiece are known from the prior art. For example, a method for setting the focal position of a laser beam aimed at a workpiece is described in DE 102 48 458 B4, where the distance between the machining head from which the laser beam comes and the surface of the workpiece is kept constant, and the proportion of radiation coming from a region of the zone of interaction between the laser beam and workpiece is detected within the machining head by a radiation detector and focusing optics disposed in the machining head are shifted so that a signal corresponding to the detected radiation takes on a maximum value. The maximum value of the detected radiation power is achieved when the focal position of the laser beam relative to the workpiece is optimum for the machining. The focal position of the laser beam of the machining laser relative to the workpiece and to the machining head can be established with high precision with this method, and the establishment of the focal position initially takes place "off line" before the actual machining operation.

However, problematic with this method is the change of the focal position of the machining beam during the machining process under the thermal load of the power of the laser beam and thus the change of the effective machining point (tool center point, TCP). Changes of the position of the TCP arise as a consequence of thermal stress of the optical components of the beam guiding system and due to thermally caused focal length changes ("thermal lensing" effects). To conduct a machining process that is as efficient as possible, these thermal effects, which lead to a change of the position of the effective machining point on or with respect to the surface of the workpiece being machined, must be accounted for in establishing the focus of the laser beam of the machining laser.

SUMMARY OF THE INVENTION

Starting from this, one task of the invention is to design a method and a device for detecting and adjusting the focus of the laser beam of a machining laser for the laser machining of workpieces so that a change of position of the effective machining point (TCP) caused by thermal effects can be taken into account in setting the focus.

Capacitive working distance controls, with which the working distance between the workpiece surface and the machining head from which the laser beam of the machining laser comes are detected and controlled to an optimum value, are usually used in laser cutting. However, these known methods for regulating the working distance in laser cutting enable at the same time only the detection and regulation of the distance between the workpiece surface and the working head or its nozzle, from which the laser beam of the machining laser exits. Changes of position of the TCP as a consequence of thermal stress of the optical components of the beam guiding system at full machining laser power cannot be detected and thus are not readjusted. Beyond that, capacitive measurement of distance gives rise to problems when the laser beam of the machining laser strikes the flat workpiece surface at a sharp angle, since capacitive measurement of distance has different axial and lateral sensitivities. In addition, capacitive distance measurement can only be used when machining electrically conductive workpieces.

In laser welding, capacitive working distance measurements are very imprecise, since the metal vapor-protective gas cloud that arises above the zone of interaction during laser welding greatly distorts capacitive measurement. Specifically, as a rule, a protective gas that is directed as a coaxial laminar low-pressure stream onto the interaction zone is used in laser welding. The welding process can be affected by the (chemical) composition of the protective gas. As a rule, in laser welding, an at least partially ionized metal vapor cloud forms in the direction of the irradiation above the zone of interaction and can sometimes ionize the protective gas. The ionized metal vapor-protective gas cloud that results can greatly distort a capacitive measurement of distance or, in many cases, even make it impossible.

Starting from this, the invention is based on the further task of demonstrating a method and a device for the laser machining of workpieces that enable accurate detection of the working distance between the workpiece surface and the machining head from which the laser beam of the machining laser exits, both in laser cutting and in laser welding.

Because of differing requirements, different machining heads are usually used for laser cutting and laser welding. In laser welding, the power of the laser beam of the machining laser is, as a rule, considerably lower than in laser cutting. On the other hand, in laser cutting, the working distance between the machining head and the workpiece surface must be able to be readjusted rapidly. In order to guarantee this, special low-weight machining heads have to be used for laser cutting. To keep the weight of a machining head for laser cutting as low as possible, lenses with which the laser beam of the machining laser is focused on the workpiece surface are used for the focusing optics. However, because of this, the maximum usable beam power of the machining laser for a given beam diameter is limited and the low-weight machining head that is specially prepared for laser cutting can therefore not be used for laser welding, in which higher beam powers are required.

As a rule, lenses, which would not withstand the high beam powers, are not used in machining heads for laser welding for focusing the laser beam of the machining laser; rather, metal mirrors are used. Another task of the invention therefore is to demonstrate a device for laser machining of workpieces that can be used both in laser cutting and in laser welding and that enables rapid regulation of the working distance between the workpiece surface and the machining head.

Said tasks are solved with a method for detecting and adjusting the focus of a laser beam in the laser machining of workpieces having the process steps specified in Claim 1. Furthermore, a device for detecting and adjusting the focus of the laser beam in the laser machining of workpieces having the characteristics of the additional independent Claim 13 contributes to solving the tasks. Preferred embodiments of the method and the device for detecting and adjusting the focus of a laser beam in the laser machining of workpieces can be taken from the dependent Claims 2-12 and 14-18.

In the method in accordance with the invention, according to Claim 1, first a laser beam of a machining laser coming from a machining head is directed onto the surface of the workpiece to be machined and focused there at a machining point (TCP) on or with respect to the workpiece surface, where the focusing takes place by means of an optical focusing element. Besides the laser beam of the machining laser, the radiation emitted by a first adjusting light source and a second adjusting light source are directed onto the workpiece surface and focused there, where the wavelengths of the beams emitted by the adjusted light sources are different. The electromagnetic radiation arising around the machining point due to scattering and/or reflection of the laser beam of the machining laser at the surface of the workpiece to be machined is uncoupled and directed to a first detector, which detects the intensity of said radiation. The radiation of the adjusting light sources reflected back from the workpiece surface around the machining point is likewise detected by the optical system with chromatic aberration and the intensities of the back-reflected radiation of the adjusting light sources are separately detected by means of at least one second detector. Finally, using the intensities detected by the detectors, the instantaneous position of the focus of the laser beam of the machining laser is determined and the focus of the laser beam of the machining laser is adjusted to the desired machining point that is optimum for laser machining with respect to the surface of the workpiece.

The distance between the workpiece surface and the machining head can be determined from the intensities of the reflected radiation of the adjusting light sources, which can be detected separately. From the knowledge of the distance between the workpiece surface and the machining head, on the one hand, and the exact instantaneous position of the focus of the laser beam of the machining laser on the other, it is possible to adjust the focus of the machining laser beam to a desired machining point with respect to the workpiece surface that is optimum for the laser machining of the workpiece, where changes of the focal length of the optical radiation guidance system that are caused by thermal effects in particular can be taken into account. In each case according to the application, it can be expedient to focus the machining laser beam exactly on the workpiece surface or on a machining point (TCP) lying under the workpiece surface within the workpiece. Since the instantaneous position of the focus of the machining laser beam occurs "on line" during the machining process, the thermal effects that lead to a change of focal length of the optical system, and thus to a thermally conditioned change of the position of the effective machining point (TCP), are taken into account. The method in accordance with the invention therefore enables an exact adjustment during the running machining process, thus "on line," as well as a possibly necessary readjustment of the focus of the machining laser beam to the optimum position of the machining point (TCP) with respect to the workpiece surface.

The device in accordance with the invention according to Claim 13 comprises an optical device for delivery and focusing of a laser beam emitted by a machining laser, where the optical device comprises a focusing element disposed in a machining head, which focuses the laser beam of the machining head at a machining point on or with respect to the surface of the workpiece that is to be machined, and at least one first adjusting light source and a second adjusting light source, which emit radiation of different wavelengths, and an optical device for delivery and focusing of the radiation emitted by the adjusting light sources onto the surface of the workpiece to be machined. The device further comprises a first optical uncoupling device for uncoupling the electromagnetic radiation arising around the machining point due to scattering and/or reflection of the laser beam of the machining laser at the workpiece surface, where the first optical uncoupling device has a chromatic aberration. Furthermore, the device in accordance with the invention comprises a first detector for detecting the intensity of the electromagnetic radiation that is directed to said detector by means of the uncoupling device and that developed around the machining point due to scattering and/or reflection of the laser beam of the machining laser at the workpiece surface. The device further comprises a second optical uncoupling device for uncoupling the radiation of the adjusting light sources that is reflected back from the surface of the workpiece around the machining point, where the second uncoupling device likewise has a chromatic aberration. The device further comprises at least one second detector to detect the intensities of the radiation of the adjusting light sources reflected from the workpiece surface and an evaluation device to determine the instantaneous position of the focus of the machining laser beam using the intensities detected by the detectors and an adjusting device for adjusting the focus of the machining laser beam to a desired machining point with respect to the workpiece surface.

The device in accordance with the invention makes it possible to adjust the focus of the machining laser beam to a position of the machining point with respect to the surface of the workpiece that is optimum for the relevant machining of the workpiece. The adjusting can be carried out during the machining process, thus "on line," so that at any time during the machining process, an adjustment of the focus of the machining laser beam to the optimum machining point with respect to the workpiece surface while also taking into account, in particular, thermally conditioned displacements of the focal length of the mean guidance system, can be guaranteed.

BRIEF DESCRIPTION OF THE DRAWINGS

The invention will be explained in more detail below by means of an embodiment example, with reference to the accompanying drawings. In the drawings.

DETAILED DESCRIPTION OF THE INVENTION

Figure 1:
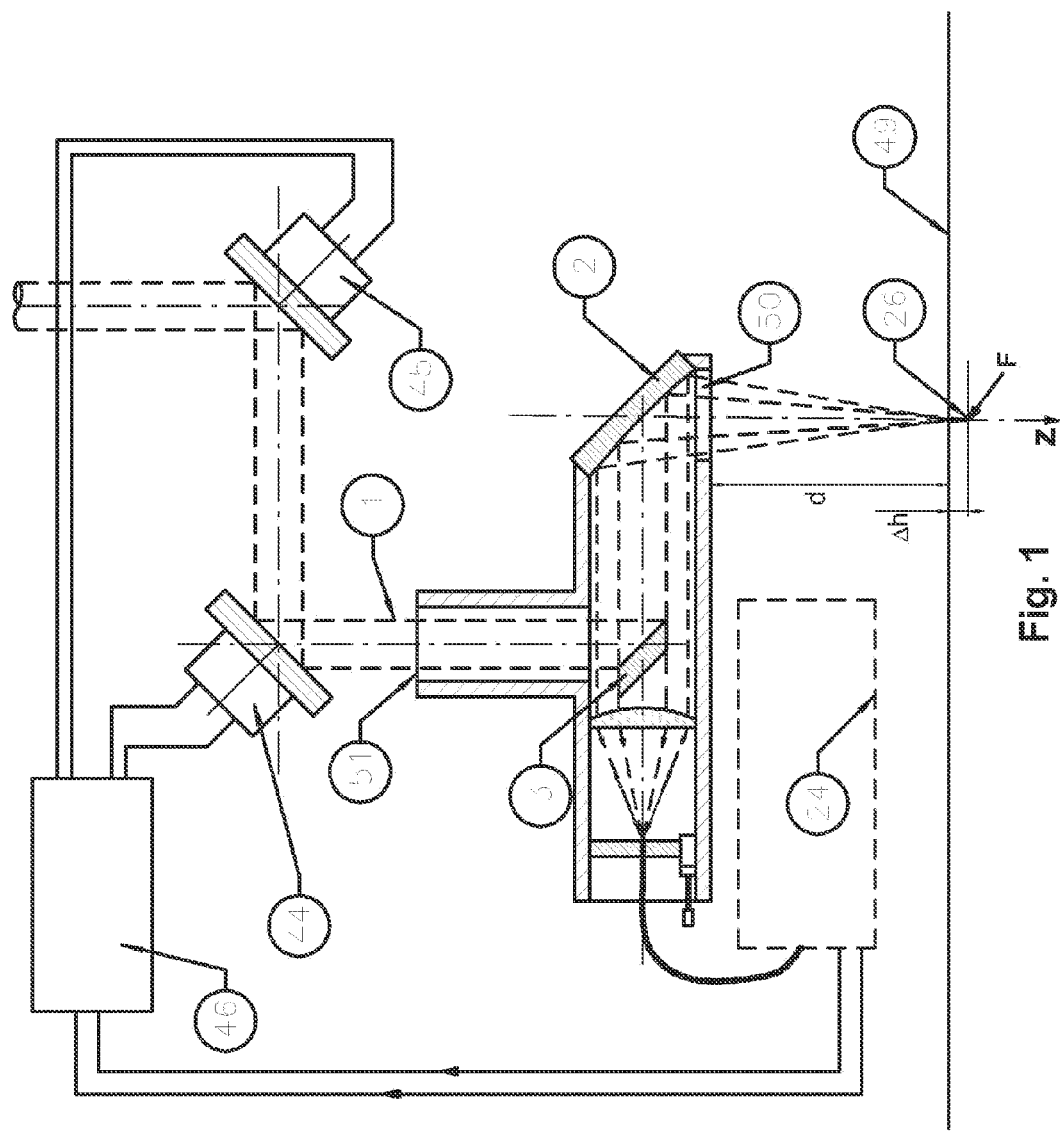
FIG. 1 is a schematic representation of a device for laser machining of workpieces with a device in accordance with the invention for detecting and adjusting the focus of the laser beam of the machining laser.

The device for laser machining of workpieces shown schematically in FIG. 1 comprises a machining laser, not shown here, which emits a laser beam 1. The machining laser can, for example, be a $CO_2$ laser, the emission spectrum of which lies in the NIR spectral range. However, other high power lasers that emit in other spectral ranges can also be used. The laser beam 1 emitted by the machining laser is deflected by two mirrors 44 and 45 into a machining head 48. The two deflecting mirrors 44 and 45 are preferably adaptive mirrors, with which the beam characteristic of laser beam 1 can be influenced. Adaptive mirrors for affecting the beam characteristic of a laser beam are known from the prior art. With such adaptive mirrors it is possible, for example, to vary the surface curvature, through which the beam divergence and/or the focal position of a laser beam striking the adaptive mirror can be changed. The two deflecting mirrors 44 and 45 preferably have an elliptical form and through this allow a deflection of the laser beam 1 by 90°. The two adaptive deflecting mirrors 44 and 45 are coupled to a computer and control unit 46 and their optical characteristic is controlled by said computer and control unit 46.

Figure 2:
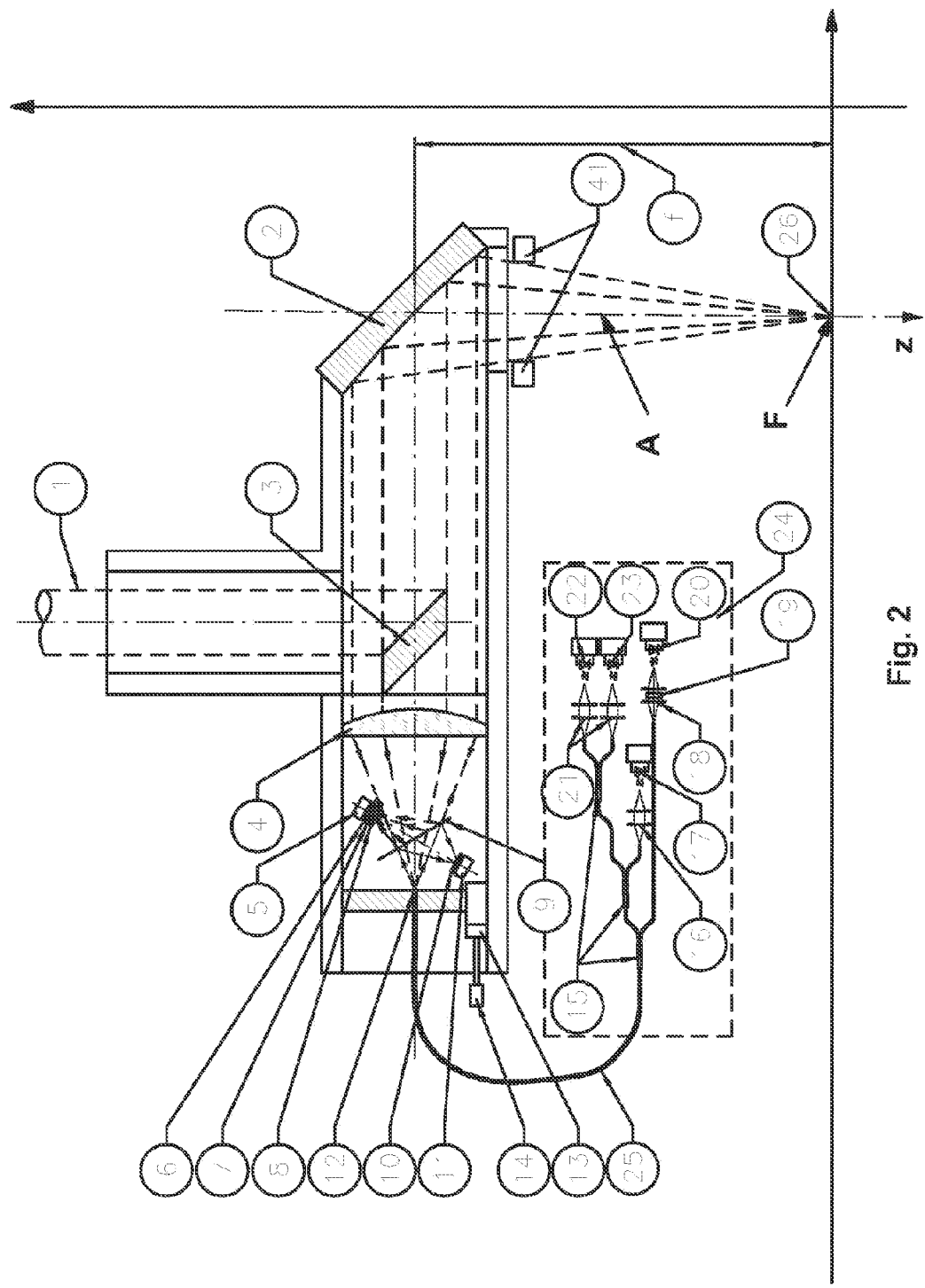
FIG. 2 is a schematic representation of the machining head of the device of FIG. 1 with a sending and receiving unit for conducting the method in accordance with the invention coupled to the machining head.

The laser beam 1 deflected by the two adaptive deflective mirrors 44 and 45 into an inlet opening 51 of the machining head 48 is deflected within the machining head 48 by a flat deflecting mirror 3 onto a focusing element 2 with focal length f (FIG. 2). The focusing element 2 is preferably a focusing mirror, which preferably has a parabolic (concave) curved metal surface. As an alternative to a focusing mirror, the focusing element can also be a lens. If the machining head is intended to be used for laser cutting, it is, however, expedient to use a focusing mirror, which, unlike a lens, can withstand the high beam powers of the laser beam 1. The laser beam 1 deflected by the deflecting mirror 3 to the focusing element 2 exits from the machining head 48 through a laser nozzle 50 and is focused by the focusing element 2 at a focus F.

Opposite the laser nozzle 50 is a workpiece that is to be machined, with a surface 49. The machining head 48 is movably disposed with respect to the workpiece to be machined, so that the laser beam 1 exiting the laser nozzle 50 can be shifted on the surface 49 in the lateral plane. Furthermore, the distance d between the machining head 48 and the surface 49 of the workpiece to be machined can be changed. For this, the machining head 48 is linked to a vibration-free drive, which can move the machining head in the z direction (therefore in the transverse direction with respect to surface 49 of the workpiece). The focused laser beam 1 of the machining laser exiting the laser nozzle 50 strikes the surface 49 of the workpiece to be machined at a machining point 26. The effective machining point 26 (called the "tool center point" (TCP)) in this case lies exactly at focus F of the laser beam 1. At the effective machining point, the material of the machined workpiece becomes heated and possibly melted in accordance with the planned machining. The effective machining point 26 can in this case expediently lie exactly on the surface 49 of the machined workpiece. In specific applications, for example in laser cutting, the effective machining point 26 can, however, also lie below the surface 49 within the material of the workpiece to be machined. One such case is shown in the embodiment example shown in FIG. 1, in which the focus F lies below the surface 49 and thus within the workpiece to be machined. The focus F and thus the effective machining point 26 are shifted into the workpiece to be machined by a length Δh with respect to the surface 49.

In order to measure the exact position of the focus F with respect to the surface 49 of the workpiece to be machined, a device for detecting the focus F of the laser beam 1 of the machining laser is provided. The individual components of this device can be learned from FIG. 2. The device for detecting the focus of the laser beam 1 comprises a first adjusting light source 22 and a second adjusting light source 23. These two adjusting light sources 22 and 23 are disposed in a sending and receiving unit 24 and each emits a narrow-band electromagnetic radiation, the wavelengths of which (the central wavelength of the spectrum emitted in each case) are different. Expediently, the two adjusting light sources 22 and 23 are light-emitting diodes or diode lasers, preferably diode lasers, that emit monochromatic laser radiation. The radiation emitted by the two adjusting light sources 22 and 23 is coupled into waveguides by means of fiber coupling optics 21. The waveguides, into which the radiation 28 and 31 emitted by the two adjusting light sources 22 and 23 has been separately coupled, are combined via a Y fiber coupler 15, which in the end directs the radiation into a waveguide 25 coupled to the fiber coupler 15. The free end of the waveguide 25 is brought to the machining head 48 and has a fiber optic connector, preferably the standard FC-APC type. The fiber coupler 12 is affixed to a movable carrier 13, which can be moved in the axial direction within the machining head 48. An adjusting screw 14 to fix the axial position of carrier 13 and the fiber connector 12 disposed thereon is provided on carrier 13. At an axial distance from the fiber connector 12, there is a lens 4 within the machining head 48. The lens 4 has a chromatic aberration. The lens 4 is disposed with respect to the fiber connector 12 so that the radiation 28 and 31 of the two adjusting light sources 22 and 23 leaving the fiber connector 12 emerges from the fiber connector 12 along the optical axis of lens 4 and is guided from lens 4 as a parallel beam bundle along the optical axis of lens 4. To guarantee optimum uncoupling and parallel guidance of the beams of radiation 28 and 31 emitted by the two adjusting light sources 22, 23, the fiber connector 12 is fixed at the focus of lens 4 by means of the carrier 13. The parallel beam bundle for the radiation 28 and 31 emitted by the two adjusting light sources 22 and 23 coming from lens 4 strikes the focusing element 2 along the optical axis and is focused by the focusing element at focus F. Since the parallel beams of the two adjusting light sources 22 and 23 are blocked at the center by the flat mirror between lens 4 and focusing element 2, the radiation 28, 31 and 29 emitted by the adjusting light sources 22, 23 and 17 forms a ring around the machining point 26 on the surface 49 of the workpiece to be machined. A distortion of the reflection at the surface, which could arise if the reflection takes place directly at the effective machining point 26 (TCP), can be avoided through this.

The device for detecting the focus of the laser beam 1 additionally comprises a first optical uncoupling device for uncoupling the electromagnetic radiation arising around the effective machining point 26 due to scattering and/or reflection of the laser beam 1 of the machining laser at surface 49 of the workpiece to be machined. In the embodiment example shown in FIG. 2, the first optical uncoupling device is composed of the optical focusing element 2, the lens 4, and a beam splitter 9. The beam splitter 9 is disposed at an oblique angle to the optical axis in the beam path between the fiber connector 12 and the lens 4, as shown in FIG. 2. The electromagnetic radiation arising due to scattering and/or reflection of the laser beam 1 of the machining laser at the surface 49 of the workpiece to be machined is back-reflected or scattered through the laser nozzle 50 into the machining head 48 and guided there by focusing element 2 as a parallel beam bundle to the lens 4. The central region of the back-reflected or scattered parallel beam bundle of said electromagnetic radiation from the interaction zone (thus from reflections or scattered rays coming from the effective machining point TCP) is masked by the flat mirror 3 and does not reach the center of lens 4. The electromagnetic radiation coming from surface 49 about the effective machining point 49 [sic; 26] and back-reflected or scattered into the machining head 48 is therefore reproduced as a circular ring on lens 4 and is focused by the lens and reflected by the beam splitter 9 (partially) in the direction of a first detector 5. The deflector 5 is disposed with respect to the beam splitter 9 so that the radiation from the interaction zone focused by the lens 4 becomes focused on the photosensitive surface of the detector 5. An orifice 6 and a first filter 7 and a second filter 8 are preferably disposed in front of detector 5. The first filter 7 has a band pass characteristic with respect to the radiation 30 emitted by the machining laser. The second filter 8 is a gray filter for attenuation of the radiation from the interaction zone directed to the detector 5. The intensity of the electromagnetic radiation coming from the interaction zone, which arises there due to interaction of the laser beam 1 with the workpiece to be machined or through direct back-reflection or scattering of the machining laser beam, can be detected with detector 5.

Figure 5:
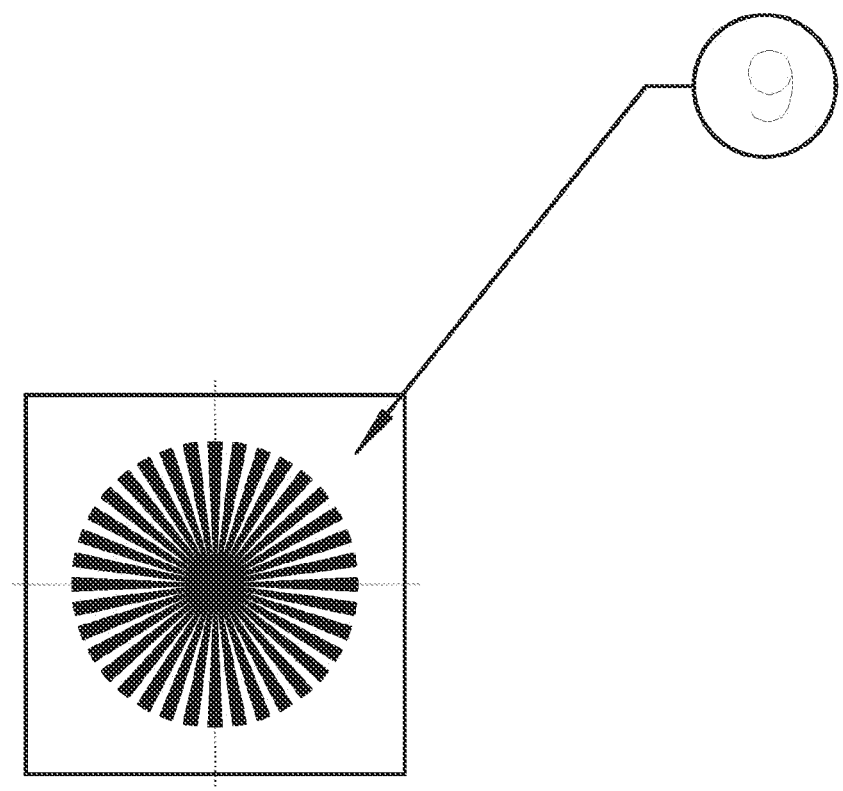
FIG. 5 is a preferred embodiment of the beam splitter used in the device of FIG. 1.

The beam splitter 9 shown in detail in FIG. 5 is preferably designed as a beam splitter mask and can either be designed as a macroscopic mask without diffractive properties, or it can also have a finer structure that has diffractive properties. In the first, preferred case, the function of the beam splitter mask 9 is comparable to that of a 50% polka-dot beam splitter, in which the transparent carrier plate of the beam splitter is vapor coated with metallic islands in a surface ratio of 50%. Because of the arrangement selected here, a radial mask structure is preferred, especially since such components are available on the market as standard components. In addition, the fiber exit surface in connector 12 is the effective receiving aperture of the measurement system. The optical fiber in connector 12 can also be designed as a fiber bundle. For the case where the beam splitter mask 9 works in a markedly diffractive fashion, it is the effective receiving aperture of the measurement system. The use of such masks, but designed as linear lattices, is known from the prior art, for example DE10056329, where separate lattices are used for the sending and receiving paths. In contrast to the use in DE10056329, the beam path in passing through the lattice is divergent in the preferred embodiment example of this invention, while in the application of DE10056329 it is parallel. The preferably selected beam splitter mask 9 leads to an improvement of the contrast of the measurement signals, since regions from the object plane that are not out of focus are blocked by the beam splitter mask 9.

The device for detecting the focus F of the laser beam 1 further comprises a second uncoupling device for uncoupling the radiation of the two adjusting light sources 22 and 23 that is back-reflected around the effective machining point 26 from the surface 49 of the workpiece to be machined. Said second optical uncoupling device consists of the optical focusing element 2, the lens 4, the fiber connector 12, the waveguide 25 and a Y fiber coupler 15. The radiation 28 and 31 of the two adjusting light sources 22 and 23 that arises in a ring shape around the machining point 26 on the surface 49 of the workpiece to be machined is back-reflected from surface 49 through the laser nozzle 50 into the machining head 48 and there directed by focusing element 2 as a parallel beam bundle to the lens 4, and from the lens 4 is coupled into the waveguide 25 through the fiber connector 12, which is disposed at the focus of the lens 4. At the other end of the waveguide 25, the radiation of the two adjusting light sources 22 and 23 back-reflected from the surface 49 is uncoupled from the waveguide by means of focusing optics 18 and focused on a second detector 20. Preferably another filter 19, which has a bandpass characteristic relative to the spectra emitted by the two adjusting light sources 22 and 23, is disposed in front of the second detector 20. The two adjusting light sources 22 and 23 are driven in modulated fashion in their radiation output. In this way it is possible to associate the radiation of the two adjusting light sources 22 and 23 back-reflected at the surface 49 with the relevant adjusting light source 22 or 23. The detector 20 can therefore detect the intensities of the back-reflected radiation of the adjusting light sources 22 and 23 separately from each other. The modulation techniques and the necessary coupling of the detector 20 to the modulation control of the adjusting light sources 22 and 23 that are necessary for this are known from the prior art. In particular, frequency modulations, phase modulations or time multiplex modulations are suitable for this. The use of different polarization states of the beams emitted by the adjusting light sources 22 and 23 are also suitable for modulation.

An additional detector 11 is provided in the region between the fiber connector 12 and the lens 4 to detect the intensities of the radiation 28 and 31 emitted by the two adjusting light sources 22 and 23. The radiation 28 and 31 of the two adjusting light sources 22 and 23 exiting the fiber connector 12 is reflected at the back side of the beam splitter 9 (partially) and focused on the light sensitive surface of the detector 11. The detector 11 is coupled to the modulation regulation of the two adjusting light sources 22 and 23, so that it can detect the beams 28 and 31 emitted by the adjusting light sources 22 and 23 separately.

Figure 3:
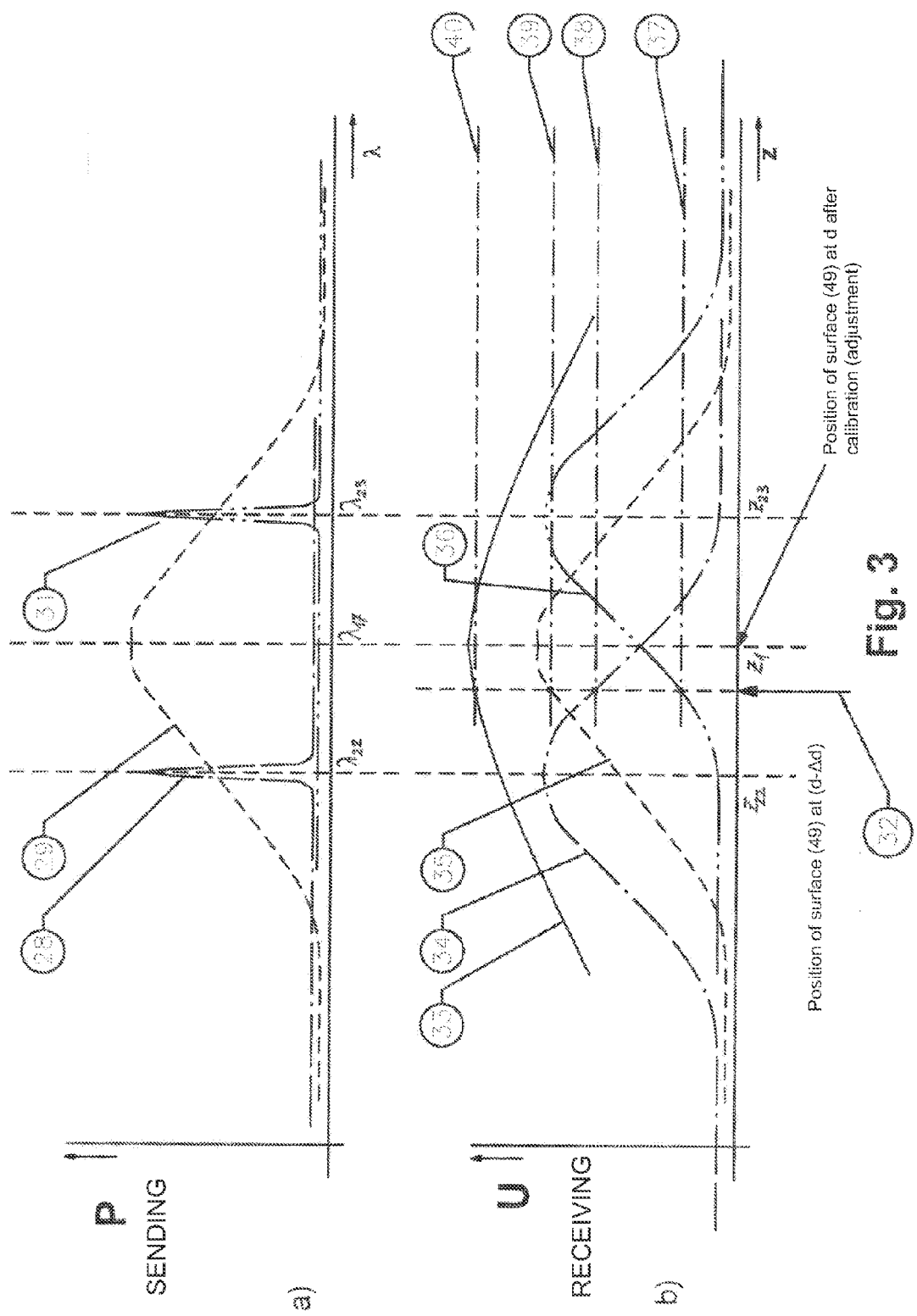
FIG. 3 is a representation of the emission spectra of the laser beam of the machining laser and the radiation emitted by the adjusting light sources of the device in accordance with the invention (FIG. 3a) and the intensities of the laser beam of the machining laser and the adjusting light sources received by the detectors of the device in accordance with the invention (FIG. 3b)

Preferably, a third adjusting light source 17 is also disposed in the sending and receiving unit 24; it is intended to increase the spatial resolution in the z direction in the region of the specified position of the focal plane. Said third adjusting light source 17 emits, compared to the initial spectra of the two other adjusting light sources 22 and 23, a relatively broad polychromatic radiation spectrum 29, the peak of which lies at a central wavelength $\lambda_{17}$. The third adjusting light source 17 is expediently selected so that the central wavelength $\lambda_{17}$ lies exactly or at least roughly in the middle between the wavelengths $\lambda_{22}$ and $\lambda_{23}$ of the two other adjusting light sources 22 and 23 (FIG. 3a). The radiation emitted by the third adjusting light source 17 is coupled into a waveguide by means of lens optics 16 and guided by a Y fiber coupler into waveguide 25, in which the radiation of the two other adjusting light sources 22 and 23 is also guided to the machining head 48.

The spectra emitted by the adjusting light sources 17, 22 and 23 are plotted as a function of intensity versus wavelength in FIG. 3a. The emission spectrum of the first adjusting light source 22 is indicated by reference number 28 and the emission spectrum of the second adjusting light source 23 is designated with reference number 31, while the course of the intensity of the radiation spectrum of the third adjusting light source 17 is designated in FIG. 3a by reference number 29. As results from FIG. 3a, the emission spectrum 28 of the first adjusting light source 22 lies on the ascending flank of the broadband emission spectrum of the third adjusting light source 17 and the narrow band emission spectrum 31 of the second adjusting light source 23 lies on the descending flank of the broadband radiation spectrum 29 of the third adjusting light source 17. The wavelengths $\lambda_{17}$, $\lambda_{22}$, and $\lambda_{23}$ expediently lie in the visible region of the spectrum.

In FIG. 3b, the intensity of the electromagnetic radiation that resulted around the machining point 26 due to scattering and/or reflection of the laser beam 1 of the machining laser at the surface (49) of the workpiece to be machined, which is detected by a detector 5, and the intensities of the radiation back-reflected from the adjusting light sources 22 and 23 at the surface 49 that are detected by detector 20, are plotted as a function of the position z of the machining head 48 with respect to the surface 49 of the workpiece to be machined along the optical axis A of the focusing element 2. If there is a change of the distance d of the machining head 48 to the surface 49 along the z direction, the detector 5, which detects the intensity of the radiation scattered or reflected from the machining laser at the surface 49, provides the envelope curve indicated in FIG. 3b by reference number 33. The intensities of the is radiation from the two adjusting light sources 22 and 23 back-reflected at the surface 49 and detected by the second detector 20 are shown in FIG. 3b by the envelope curves 34 and 36, where the envelope curve 34 corresponds to the intensity of the radiation back-reflected from the first adjusting light source 22 and envelope curve 36 corresponds to the radiation back-reflected from the second adjusting light source 23. The offset of the peaks of the two envelope curves 34 and 36 results from the chromatic error of lens 4. The beams back-reflected from the adjusting light sources 22 and 23 are each exactly focused at two points, which lie above or below the workpiece surface 29. If the work piece surface 49 is situated exactly in the focal plane (thus at focus F) of the focusing element 2, the back-reflections of the two adjusting light sources 22 and 23 are out of focus at the detector 20.

The distance d between the workpiece surface 49 and the machining head 48 and the relative shift $\Delta h$ of the effective machining point (TCP) is determined from the intensities detected by the detectors 5 and 20 as follows:

First, with the machining laser beam 1 switched off, an adjustment of carrier 13, with the fiber connector 12 disposed thereon, and the distance d between the machining head 48 and the surface 49 is made in order to set the envelope curves 33 through 36 of the measurement signals preferably in the relative position shown in FIG. 3b. With that, the measurement range of the TCP and its dynamic load-dependent shift between wavelengths $\lambda_{22}$ and $\lambda_{23}$ or the pertinent and corresponding z position $z_{22}$ and $z_{23}$ is fixed. The wavelengths $\lambda_{22}$ and $\lambda_{23}$ of the adjusting light sources 22 and 23 become fixed by the relevant choice. They are symmetrically set around $z_1 \sim \lambda_1$ through the mechanical adjustment. On the basis of the modulation of the adjusting light sources 17, 22, and 23, the detected envelope curves 33-36 of the measurement signals can be unambiguously associated with their relevant sources (adjusting light sources 17, 22, and 23) if there is a change of the distance d between the machining head 48 and the surface 49. Known electronic and/or optical filtering methods are used for this. Because of the high optical error signal level from the interaction zone around the machining point 26 (TCP) during laser machining, one nevertheless must take into account chance ["aleatoric"] variations. To increase the reliability of the measurement, the measured values are obtained as follows, where only the most important steps are described here:

The TCP before the laser machining process corresponds to the set distance d, and at this time (therefore, with the machining laser 1 switched off) the shift of the machining point (TCP) $\Delta h = 0$.

$$d \sim \frac{U_{34}}{U_{36}}, \quad (1.1)$$

where $U_{34}$ and $U_{36}$ are the respective instantaneous intensity values of the envelope curve 34 (beam of adjusting light source 22 reflected at surface 49) detected by detector 20 and of the envelope curve 36 (beam of adjusting light source 23 reflected at surface 49). This also corresponds to the adjusting condition according to which the envelope curve 33 of the back-reflection of the machining laser beam 1 from the interaction zone must exhibit a maximum at coordinate z=d. For that, the relation (1.1) in the equation:

$$\frac{U_{34}}{U_{33}} = \frac{U_{36}}{U_{33}} \quad (1.2)$$

changes, where $U_{33}$ is the initial value of the envelope curve 33 (back-reflection of machining laser beam 1 from the interaction zone) detected by detector 5.

Through this, the maximum of the envelope curve 33 of the machining laser beam 1 at $z_1$ lies in the range between $z_{22}$ and $z_{23}$ (FIG. 3b), assuming that the intensities of the emission maxima of the adjusting light sources 22 and 23 (maximum values of the emission spectra 28 and 31, FIG. 3a) are set to be about the same magnitude. Since the optical components 2 and 4 do not become deformed under the thermal load of the machining laser beam 1, the ratio according to (1.1) is rigidly linked to the machining head 48. Due to the beam splitter 9 and the shadow of the mirror 3, the focal plane of all light sources outside the machining laser consists of one or several circular segments or of a circular ring of foci disposed around the machining point 26 (TCP) on the surface 49. The first adjusting light source 22 is exactly focused at $z_{22}$ and the second adjusting light source 23 is exactly focused at $z_{23}$. Otherwise, the reproductions at the relevant wavelength on the surface 49 are out of focus. The light of the polychromatic third adjusting light source 17 also has its intensity maximum set at $z_1 \sim \lambda_1$. The envelope curve 35 of the back-reflection of the third adjusting light source 17 is formed by the z course of the back-reflection maxima, which always changes the wavelength in correspondence with the relevant position of the surface 49. To increase the resolution of the measurement of d, the ratio (1.1) becomes folded (multiplied) with the back-reflection of the adjusting light source 22; see term (1.3).

For dynamic evaluation of $\Delta h$ (thus, a thermally conditioned shift of the machining point 26) during the laser machining process (thus with the machining laser switched on), the shift of the signal of the envelope curve 33 compared to the measured position d of the machining point 26 (TCP) is calculated. For this, the difference or the ratio of the terms from (1.2) is formed, while:

$$\frac{U_{34}}{U_{36}} \cdot U_{35} \quad (1.3)$$

remains constant.

$$\Delta h \sim \left[ \frac{U_{36}}{U_{33}} - \frac{U_{34}}{U_{33}} \right] \quad (1.4)$$

or $$\Delta h \sim \log \frac{\frac{U_{36}}{U_{33}}}{\frac{U_{34}}{U_{33}}} = \log(U_{36}/U_{34}) \quad (1.5)$$

Based on the expected chance variations of the signals, two ratios are formed from the measured values, namely $U_{36}/U_{33}$ and $U_{34}/U_{33}$. Each of the two ratios in and of itself would already contain the information on $\Delta h$, but the formula (1.4) or (1.5) improves the signal/noise ratio. For $\Delta h = 0$ (i.e., before laser machining, with the machining laser switched off), the mechanical adjustment is preferably undertaken so that the two said ratios are the same. Under a thermal load, one of the measured values (ratios) will become smaller and the other larger. Therefore, $\Delta h$ is proportional to the difference [formula (1.4)] or to the ratio [formula (1.5)]. Here $\Delta h$ is given in reference to term (1.3), which corresponds to the distance d. The values from the equations 1.4 and 1.5 by themselves, as a rule, are still not suitable for calculating the exact shift of the TCP $\Delta h$, since the distance d between the machining head 48 and surface 49 can also change in the machining operation. Therefore, the following relations are formed for the calculation of $\Delta h$:

$$\Delta h \sim \frac{U_{34}}{U_{36}} \cdot U_{35} - \left[ \frac{U_{36}}{U_{33}} - \frac{U_{34}}{U_{33}} \right] \quad (1.6)$$

or $$\Delta h \sim \frac{U_{34}}{U_{36}} \cdot U_{35} - \frac{\frac{U_{36}}{U_{33}}}{\frac{U_{34}}{U_{33}}} \quad (1.6')$$

i.e., $\Delta h$ is proportional to the difference (1.3)-(1.4) or (1.3)-(1.5).

The proposed evaluation method is a preferred possibility. Other possibilities for evaluation will open up to one skilled in the art.

For illustration, FIG. 3b gives an example of a specific position (z position) of the surface 49 with respect to the machining head 48. A specific z position of the surface 49 is indicated in FIG. 3b with reference number 32 and corresponds to a distance of the surface 49 to the machining head 48 of $z=d-\Delta d$. The horizontal lines (dot-dash lines) designated with the reference numbers 37, 38, 39, and 40 show, at the intersection with the envelope curves 33, 34, 35, and 36 associated with each of them, the relevant measurement value of the intensity detected by the relevant detector (5 or 20) at said z position 32 of the surface 49, where horizontal line 37 is associated with envelope curve 36 (coming from the second adjusting light source 23), horizontal line 38 is associated with envelope curve 34 (coming from the first adjusting light source 22), horizontal line 39 is associated with envelope curve 35 (coming from the third adjusting light source 17), and horizontal line 40 is associated with envelope curve 33 (coming from the machining laser from the zone of interaction). The intersection of the horizontal line with its associated envelope curve shows in each case the instantaneous intensity value $U_{33}$, $U_{34}$, $U_{35}$, or $U_{36}$ from the relevant envelope curve, which is measured at the instantaneous z position of the surface 49 by the relevant detector 5 or 20.

With the machining laser switched off (i.e., at $\Delta h=0$) and a (pre)adjustment, in which the distance d is chosen so that the focus F of the focusing element 2 lies on the surface 49 (see FIG. 3b, position of surface 49 at z=d after adjustment), the back-reflections of the adjusting light sources 22 and 23 have the same intensity, i.e., $U_{34}=U_{36}$ and $U_{34}/U_{33}=U_{36}/U_{33}$, where $U_{33}$ takes on the maximum value. If the distance d becomes greater (with the machining laser switched off) $U_{33}$ and $U_{34}$ will decrease, whereas the measured value $U_{36}$ will increase. If the machining laser is switched on at a preadjustment of the focus F on the surface 49, $\Delta h$ will change to a nonzero value because of the thermal change of the focal length f of the focusing element 2. Because of this, the measured value $U_{33}$ will become lower, while the ratio $U_{34}/U_{36}$ remains constant.

Since the measured radiation of the adjusting light sources 17, 22, and 23 strikes the outer ring of the focusing mirror 2 (since the central region is blocked by mirror 3), where the main laser beam does not thermally deform the metal surface (a measurable deformation is present in the center, but as a rule the mirror is water-cooled, and the deformation does not spread from the center to the edge), the ratio $U_{34}/U_{36}$ remains constant and is proportional to the set distance d (see relationship 1.1). The third adjusting light source 17 (thus the factor $U_{35}$ in the above equations) only improves the steepness of the resulting curve and thus improves the z resolution.

From the intensities detected by detectors 5 and 20, the distance d between the machining head 48 and the surface 49 of the workpiece to be machined as well as the instantaneous z position of the focus F of the laser beam 1 (or a shift $\Delta h$ compared to the original (starting) adjustment) of the machining laser is determined in the manner described above. With the determined data, the position of the focus F with respect to the surface 49 of the workpiece to be machined can be adjusted to an optimum position for the planned machining. For this, for one thing, the distance d between the machining head 48 and the surface 49 of the workpiece to be machined can be set to a desired value by means of the drive of the machining head 48. For this, first, before the beginning of laser machining with the machining laser switched off, the distance d between the machining head 48 and the surface 49 as well as the position of the focus F with respect to the surface 49 are determined via the two adjusting light sources 22 and 23. If it turns out that the focus F is not at the optimum machining point 26 (TCP) with respect to surface 49, either the distance d can be readjusted via the drive of the machining head 49 or the focal lens 27 of focusing optics 2 can be changed via the adaptive mirrors 44 and 45. After completed (pre)adjustment of the focus F with respect to the surface 49 of the workpiece to be machined to a desired machining point 26 (which can lie exactly on surface 49 or even under it, i.e., in the material of the workpiece to be machined) the machining laser is switched on and brought to full power. When the machining laser is running at full power, the optical characteristics of the radiation guidance components, in particular the mirrors 2 and 3 and 44 and 45, change. These changes of the optical characteristics of the radiation guidance components caused by thermal effects change the position of the focus F with respect to the surface 49 of the workpiece to be machined and thus the effective position of the machining point 26 with respect to the workpiece. In order to guarantee optimum adjustment of the focus F to the desired machining point 26 during the ongoing machining process at full power of laser beam 1, for one thing, the distance d between the machining head 48 and the surface 49 and at the same time the instantaneous position of the focus F are determined by means of the device for detecting the position of the focus F. If the position of focus F deviates from the desired machining point 26, a readjustment can take place via a change of the focal position F by means of the adaptive mirrors 44 and 45. Because of the instantaneous response behavior of the adaptive mirrors 44 and 45, this can take place in a very short time, specifically in the millisecond range. If there is a greater shift of the instantaneous position of the focus F from the desired machining point 26 with respect to the surface 49, initially a (rapid) readjustment of focus F can take place via the adaptive mirrors 44 and 45 and then a readjustment of the distance d between the machining head 48 and the surface 49 can take place, and during the change of the distance d, the position of the focus F can again be reset via the adaptive mirrors 44 and 45.

In order to be able to undertake the required adjustment of the position of the focus F by means of the adaptive mirrors 44 and 45, the calculation and control unit 46, which controls the positioning and especially the curvature of the adaptive mirrors 44 and 45, is coupled to the sending and receiving unit 24 of the device for detecting the position of the focus F. Through this, for one thing, a very exact adjustment of the focus F to the desired and optimum machining point 26 takes place, and for another, a readjustment of the focal position necessitated in particular by thermal effects takes place rapidly in the millisecond range.

In order to determine the slope of the surface 49 of the workpiece to be machined in the region of the machining point 26 (thus around the TCP), a plurality of slope detectors 41 or a 4Q detector are disposed at the machining head 48. The slope detectors 41 are disposed symmetrically around the laser nozzle 50 on the outside of the machining head. The slope detectors 41 detect the radiation coming from the interaction zone. Via the intensities of said radiation detected by the slope detectors 41, the symmetry of the circular or elliptical projection of the laser beam 1 on the surface 49, and thus any slope of the surface 49 with respect to the machining head 48, can be determined.

Figure 4:
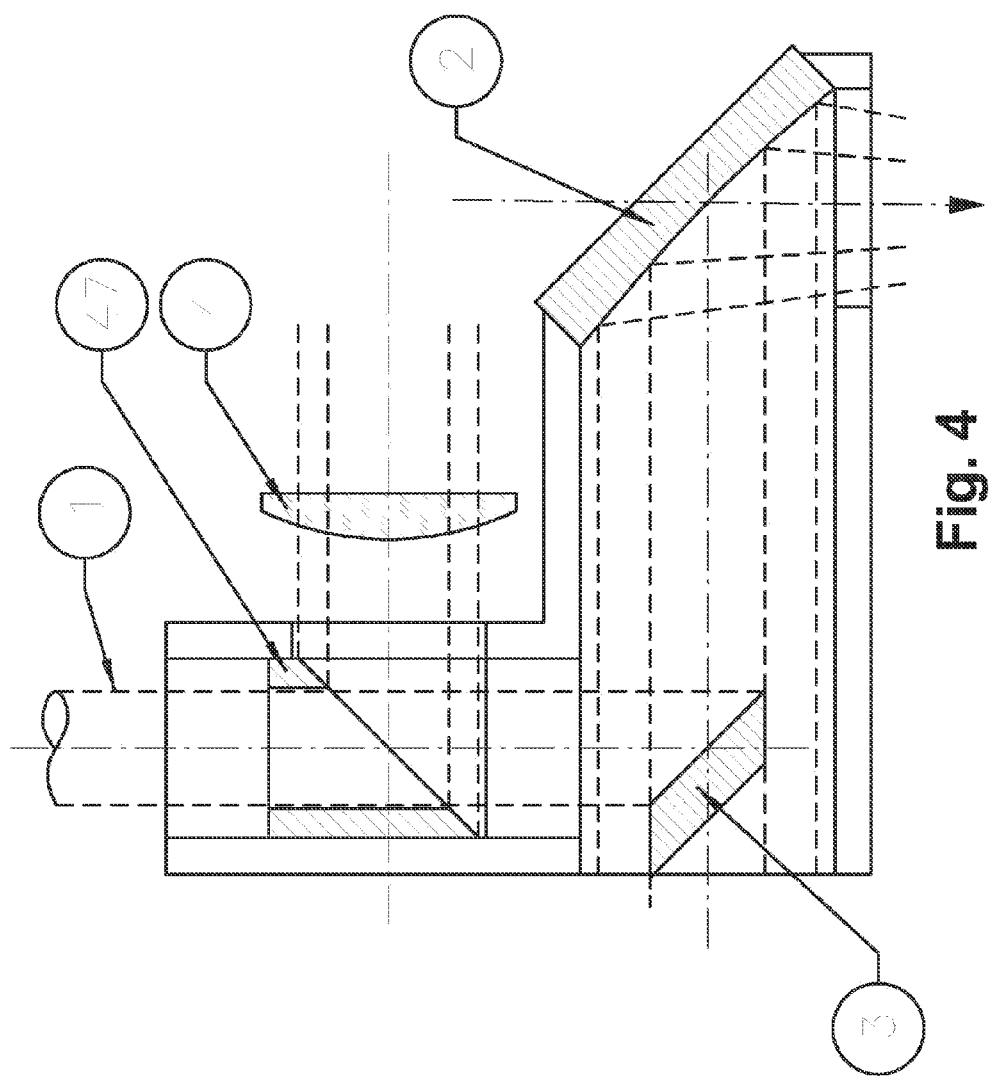
FIG. 4 is a schematic representation of an alternative embodiment of the device in accordance with the invention with a scraper mirror for uncoupling the radiation of the machining laser and the adjusting light sources reflected from the workpiece surface.

The coupling and uncoupling of the radiation of the adjusting light sources 22, 23, and 17 can also take place in a different way. FIG. 4 shows an alternative embodiment of the device in accordance with the invention. In this embodiment example, the coupling and uncoupling of the radiation of the adjusting light sources 22, 23, and 17 takes place via a scraper mirror 47. Such scraper mirrors are known from the prior art, for example from DE 41 06 008 A1.

The invention claimed is:

1. A method for detecting and adjusting the focus (F) of a laser beam in the laser machining of workpieces having the following steps:
   a) delivery and focusing of a laser beam of a machining laser (1) emitted from a machining head (48) into a machining point (26) on or with respect to the surface (49) of a workpiece to be machined, where the focusing takes place by means of an optical focusing element (2),
   b) delivery and focusing of the radiation (28, 31) emitted by at least one first adjusting light source (22) and a second adjusting light source (23) onto the surface (49) of the workpiece to be machined, where the wavelengths of the radiation admitted by the adjusting light sources (22, 23) are different,
   c) uncoupling the electromagnetic radiation arising around the machining point (26) due to scattering and/or reflection of the laser beam (1) of the machining laser at the surface (49) of the workpiece to be machined, by means of an optical system (2, 4) having chromatic aberration and detecting their intensity by means of a first detector (5),
   d) uncoupling the radiation (34, 36) of the adjusting light sources (22, 23) back-reflected from the surface of the workpiece to be machined by means of the optical system (2, 4) having chromatic aberration and separate detection of the intensities of the reflected radiation (34, 36) of the adjusting light sources (22, 23) by means of at least one second detector (20),
   e) determining the position of the focus (F) of the laser beam (1) of the machining laser using the intensities detected in steps (c) and (d),
   f) adjusting the focus (F) of the laser beam (1) of the machining laser onto a desired machining point (26) with respect to the surface (49) of the workpiece to be machined.

2. A method as in claim 1, wherein the distance (d) between the surface (49) of the workpiece to be machined and the machining head (48) is determined from the intensities of the reflected radiation (34, 36) of the adjusting light sources (22, 23).

3. A method as in claim 1, wherein the adjusting light sources (22, 23) are light-emitting diodes (LEDs) or diode lasers that have a narrow band emission spectrum.

4. A method as in claim 2, wherein the adjusting light sources (22, 23) emit monochromatic radiation (28, 31).

5. A method as in claim 4, wherein a third adjusting light source (17) having a wide band emission spectrum (29) is provided, where the first adjusting light source (22) emits a radiation (28) having a wavelength $\lambda_{22}$, which lies on an ascending flank of the broadband emission spectrum (29) of the third adjusting light source (17), and that the second adjusting light source (23) emits a radiation (31) having a wavelength $\lambda_{23}$ that lies on a descending flank of the broadband emission spectrum (29) of the third adjusting light source (17).

6. A method as in claim 4, wherein the maximum of the broadband emission spectrum (29) of the third adjusting light source (17) lies exactly or at least roughly in the center between the respective wavelengths ($\lambda_{22}$ and $\lambda_{23}$) of the two other adjusting light sources (22 and 23).

7. A method as in claim 1, wherein, in addition to the adjusting light sources (22, 23), a third adjusting light source (17) is provided, which emits a broadband radiation (29) that is focused together with the narrow band radiation (28, 31) of the first and the second adjusting light sources (22, 23) onto the surface (49) of the workpiece to be machined, and from there is reflected and its reflected radiation (35) is uncoupled by means of the optical system (2, 4) and sent to the second detector (20) to detect the reflected intensity.

8. A method as in claim 1, wherein the radiation (28, 31; 29) emitted by the adjusting light sources (22, 23; 17) is modulated so that the radiation (34, 35; 36) reflected from the surface (49) of the workpiece to be machined and detected by the second detector (20) can be associated with the relevant adjusting light source (22, 23; 17).

9. A method as in claim 1, wherein the radiation (28, 31; 29) emitted by the adjusting light sources (22, 23; 17) is focused in a ring shape around the machining point (26) on the surface (49) of the workpiece to be machined.

10. A method as in claim 1, wherein a thermally caused shift Δh of the machining point (26) with respect to the surface (49) is determined from the intensities of the radiation of the adjusting light sources (22, 23) reflected back from the surface (49) and the radiation of the machining laser coming from the zone of interaction, from the relationships $$\Delta h \sim \frac{U_{34}}{U_{36}} \cdot U_{35} - \left[\frac{U_{36}}{U_{33}} - \frac{U_{34}}{U_{33}}\right]$$

or $$\Delta h \sim \frac{U_{34}}{U_{36}} \cdot U_{35} - \frac{\frac{U_{36}}{U_{33}}}{\frac{U_{34}}{U_{33}}}$$

where $U_{33}$ is the intensity of the radiation (33) coming from the machining laser beam (1) from the zone of interaction, $U_{34}$ is the intensity of the back-reflected radiation (34) from the first adjusting light source (22), $U_{36}$ is the intensity of the back-reflected radiation (35) [sic; (36)] from the second adjusting light source (23), and $U_{35}$ is the intensity of the back-reflected radiation (35) from the third adjusting light source (17).

11. A method as in claim 1, wherein the machining head (48) comprises a laser nozzle (50), from which the laser beam of the machining laser (1) exits and that a plurality of slope detectors (41) or a 4Q detector are disposed symmetrically around the laser nozzle (50), via which the slope of the surface (49) of the workpiece to be machined with respect to the machining head (48) can be determined.

12. A method as in claim 1, wherein the adjustment of the focus (F) of the laser beam of the machining laser (1) on a desired machining point (26) with respect to the surface (49) of the workpiece to be machined takes place through a change of the focal length (27) of the focusing element (2), a shift of the focusing element (2) with respect to the machining head (48), or by a change of the distance (d) of the machining head (48) from the surface (49) of the workpiece to be machined.

13. A device for detecting and adjusting the focus (F) of a laser beam in the laser machining of workpieces having
an optical device (44, 45, 3, 2) for delivering and focusing a laser beam (1) emitted by a machining laser (46), where the optical device comprises a focusing element (2) disposed in a machining head (48) that focuses the laser beam (1) of the machining laser (46) into a machining point (26) on or with respect to the surface (49) of a workpiece to be machined,
at least one first adjusting light source (22) and a second adjusting light source (23) that emit radiation (28, 31) of different wavelengths,
an optical device (15, 25, 4, 2) for delivering and focusing the radiation (28, 31) emitted by the adjusting light sources (22, 23) onto the surface (49) of the workpiece to be machined,
a first optical uncoupling device (2, 4, 9) for uncoupling the electromagnetic radiation arising around the machining point (26) due to scattering and/or reflection of the laser beam (1) of the machining laser at the surface (49) of the workpiece to be machined, where the first optical uncoupling device (2, 4, 9) has a chromatic aberration,
a first detector (5) for detecting the intensity of the electromagnetic radiation directed to the detector (5) by means of the uncoupling device (2, 4, 9), which [radiation] developed around the machining point (26) due to scattering and/or reflection of the laser beam (1) of the machining laser,
a second optical uncoupling device (2, 4, 25, 15) for uncoupling the radiation (34, 36) of the adjusting light sources (22, 23) reflected back from the surface of the workpiece to be machined, where the second optical uncoupling device (2, 4, 9) has a chromatic aberration,
a second detector (20) for detecting the intensities of the reflected radiation (34, 36) of the adjusting light sources (22, 23),
an evaluation device to determine the position of the focus (F) of the laser beam (1) of the machining laser with respect to the surface (49) of the workpiece to be machined using the intensities detected with the detectors (5, 20),
an adjustment device for adjusting the focus (F) of the laser beam (1) of the machining laser (46) to a desired machining point (26) with respect to the surface (49) of the workpiece to be machined.

14. A device as in claim 13, wherein the optical device (44, 45, 3, 2) for delivering and focusing the laser beam (1) emitted by the machining laser (46) comprises at least one adaptive mirror (44, 45), with which the focal length of the optical device (44, 45, 3, 2) and thus the position of the focus (F) can be varied.

15. A device as in claim 13, wherein the optical device (15, 25, 4, 2) for delivering and focusing the radiation (28, 31) emitted by the adjusting light sources (22, 23) comprises one or more fiber couplers (15), a waveguide (25), a lens (4), and the focusing element (2).

16. A device as in claim 13, wherein the first optical uncoupling device (2, 4, 9) comprises the focusing element (2), a lens (4) with chromatic aberration, and a beam splitter (9).

17. A device as in claim 13, wherein the second optical uncoupling device (2, 4, 25, 15) comprises the focusing element (2), a lens (4) having chromatic aberration, a waveguide (25) and at least one fiber coupler (15).

18. A device as in claim 13, wherein the adjustment device is coupled to the evaluation device.

19. A device as in claim 13, wherein a third detector (11) is provided for detection of the intensity of the radiation (28, 31) emitted by the adjusting light sources (22, 23).

* * * * *